(12) United States Patent
Taylor

(10) Patent No.: US 6,364,340 B1
(45) Date of Patent: Apr. 2, 2002

(54) WHEEL LIFTING METHOD AND APPARATUS

(75) Inventor: William L. Taylor, Eupora, MS (US)

(73) Assignee: Taylor-Made Equipment, Inc., Eupora, MS (US)

( * ) Notice: Subject to any disclaimer, the term of this patent is extended or adjusted under 35 U.S.C. 154(b) by 0 days.

(21) Appl. No.: 09/620,008

(22) Filed: Jul. 20, 2000

(51) Int. Cl.[7] .............................................. B60G 5/00
(52) U.S. Cl. ...................... 280/676; 280/683; 280/686
(58) Field of Search ............................... 280/676, 683, 280/686

(56) References Cited

U.S. PATENT DOCUMENTS

| | | | | |
|---|---|---|---|---|
| 3,762,487 A | * | 10/1973 | Bilas ........................ | 180/24.09 |
| 3,860,256 A | * | 1/1975 | Jackson et al. ........... | 280/81 R |
| 4,085,948 A | * | 4/1978 | Turner ........................ | 280/682 |
| 4,134,604 A | * | 1/1979 | Jackson ...................... | 280/704 |
| 4,741,549 A | * | 5/1988 | Gevers ..................... | 280/405 A |
| 4,741,553 A | * | 5/1988 | Raidel, II ................... | 280/682 |
| 4,966,387 A | * | 10/1990 | White, IV ................... | 280/712 |
| 5,040,826 A | * | 8/1991 | Lovell ........................ | 280/840 |
| 5,058,916 A | * | 10/1991 | Hicks ......................... | 280/704 |
| 5,058,917 A | * | 10/1991 | Richardson ................ | 280/704 |
| 5,090,720 A | * | 2/1992 | Heider et al. ............ | 280/438.1 |
| 5,110,149 A | * | 5/1992 | Dahlstrom ................. | 280/401 |
| 5,217,248 A | * | 6/1993 | Reast ......................... | 280/718 |
| 5,351,986 A | * | 10/1994 | Hedenberg et al. ......... | 280/712 |
| 5,354,091 A | * | 10/1994 | Baxter ....................... | 280/683 |
| 5,458,355 A | * | 10/1995 | Young ..................... | 280/405.1 |
| 5,458,360 A | * | 10/1995 | Raidel, Sr. ................. | 280/686 |
| 5,465,997 A | * | 11/1995 | Heitzmann ................. | 280/716 |
| 5,505,482 A | * | 4/1996 | VanDenberg .............. | 280/704 |
| 5,588,665 A | * | 12/1996 | Pierce et al. ............... | 280/704 |
| 5,615,906 A | * | 4/1997 | Raidel, Sr. ................. | 280/686 |

* cited by examiner

Primary Examiner—Eric Culbreth
Assistant Examiner—L. Lum
(74) Attorney, Agent, or Firm—Alan Ruderman; Stephen J. Stark; Miller & Martin LLP

(57) ABSTRACT

A truck trailer having a pair of tandem spaced apart rear axles and a suspension system for supporting the axles from the chassis of the trailer having a pivot member intermediate the axles about which the axles may pivot relatively to one another, the axles being connected to respective ends of leaf springs. The trailer has apparatus for lifting one of the axles relative to the other axle selectively so that the wheels carried by the lifted axle may be lifted off the roadway. The apparatus for lifting includes air bags which may be inflated by pressurized air or deflated to control the position of the axle to be raised. The air bags are positioned between one of the axles and the chassis and when pressurized air inflates the bags the other axle is lifted about the pivot member.

5 Claims, 2 Drawing Sheets

WHEEL LIFTING METHOD AND APPARATUS

BACKGROUND OF THE INVENTION

This invention relates to a method and apparatus for lifting a pair of wheels of a tandem rear axle truck trailer selectively to reduce the wear on those wheels and the associated brakes when the load in the trailer has been removed.

Large truck trailers, such as those that are designed to carry large cargo loads along roadways, generally have tandem axles at least in the rear of the trailer. So called "18-wheelers," for example, have a pair of rear tandem axles each carrying four wheels and tires. The load on each axle is thereby divided among the two rear axles and the front axle. This also places less load applied by any single axle to below the maximum permitted by federal highway bridge load regulations.

In such vehicles the multitude of tires carrying the load have an equal number of brakes which must be applied to the respective wheel to reduce the vehicle speed and stop the vehicle. Once the payload has been delivered, however, there is little reason to split the light loads at the rear of the trailer between two axles since this creates unnecessary wear on the tires and the brakes compared to having the load on only one of the axles. Thus, it would be desirable to reduce the wear on the tires and the brakes associated with one axle of the tandem pair, particularly the front axle of the rear tandem pair.

SUMMARY OF THE INVENTION

Consequently, it is a primary object of the present invention to provide a simple means for raising the front axle of a tandem axle truck trailer relative to the rear axle, thereby to lift the tires of the front axle off the roadway.

It is another object of the present invention to provide a simple means for pivoting a first axle of a tandem pair of axles relative to the other axle to lift the first axle thereby to lift the tires mounted thereon off the roadway.

It is a further object of the present invention to provide air bags intermediate the frame of a truck trailer and at least one axle of a tandem axle pair of the trailer, the axles being mounted in a suspension system about a pivot so that selective inflation of the bags may raise the one axle of the pair thereby to lift the tires mounted thereon off the road.

Accordingly, the present invention provides for a truck trailer having a pair of tandem spaced apart axles and a suspension system for supporting the axles from the chassis of the trailer which suspension system includes leaf springs connected to the axles and a pivot member intermediate the axles about which the leaf springs may pivot, apparatus for lifting one of the axles relative to the other selectively by applying a force which effects pivoting of the leaf springs about the pivot member so that the wheels carried by the lifted axle may be lifted off the roadway. The apparatus includes air bags which may be inflated or deflated to control the position of the axle to be raised. In the preferred embodiment the air bags are associated with one axle and are disposed intermediate the axle and the chassis, the air bags being inflatable to lift the other axle about the pivot member. Alternatively, the air bags may be associated with both axles and kept inflated until one axle is to be lifted, at which time the air bags associated with the other axle may be deflated.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
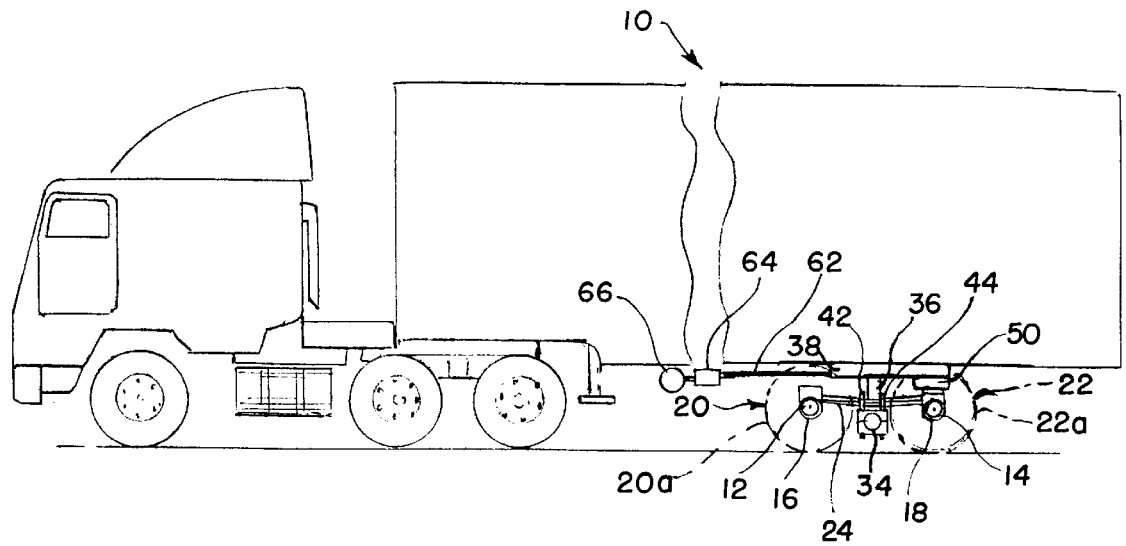
FIG. 1 is a side elevational view of a rear portion of a tandem wheel trailer incorporating axle lifting structure constructed in accordance with the present invention illustrated in the normal position.
Figure 2:
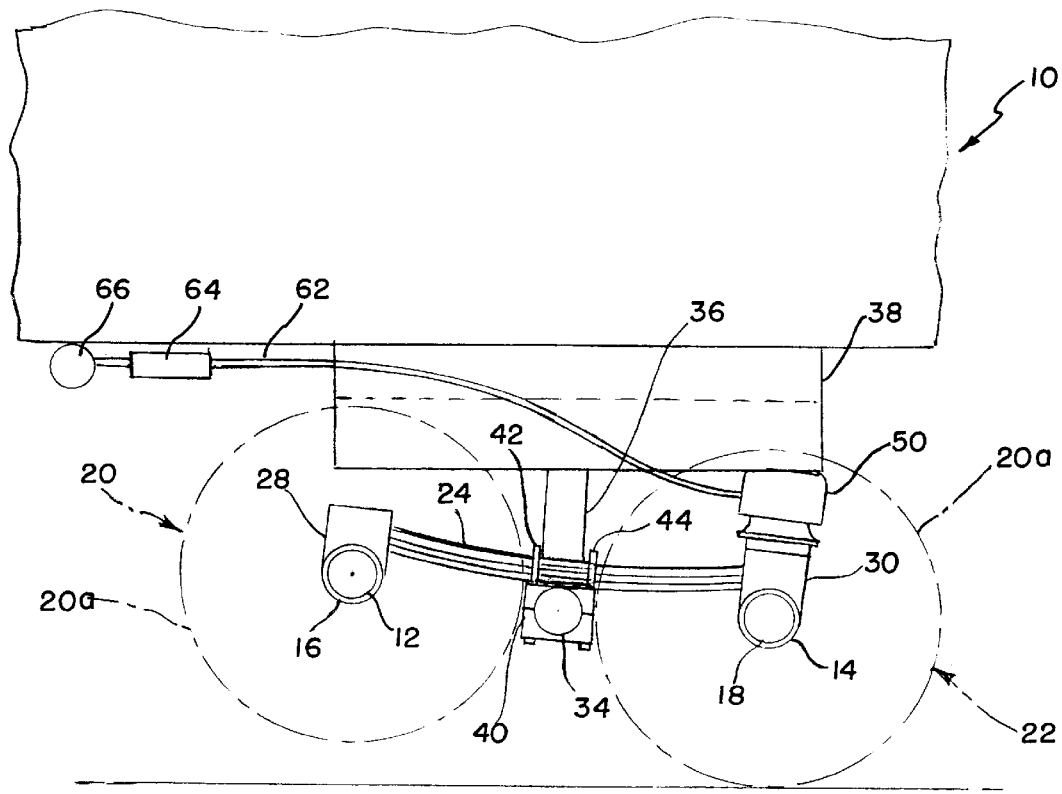
FIG. 2 is a view similar to FIG. 1 but with the apparatus illustrated in the axle lift position.
Figure 3:
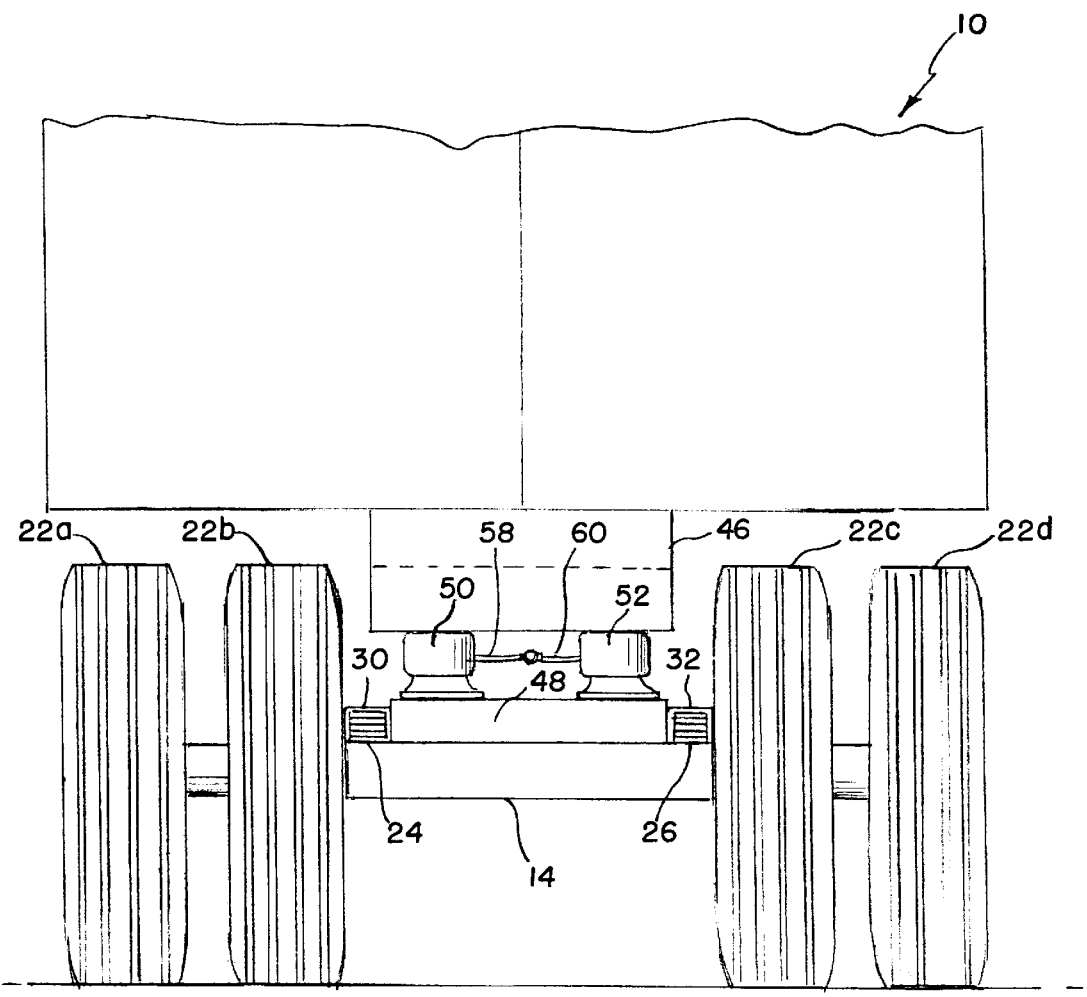
FIG. 3 is a rear elevational view of the apparatus illustrated in FIG. 2.

Referring to the drawings, the invention is illustrated as mounted on a truck trailer 10 having a pair of spaced apart axle housings 12, 14 within which are mounted axles 16, 18. Tire mounted wheel assemblies 20, 22 are mounted on the axles 16, 18. The wheel assemblies 20, 22 are the rear tandem wheel assemblies of the trailer and each assembly may comprise a pair of tire mounted wheels such as 20a, 22a, 22b, 22c, 22d, at each side of a vehicle (only one wheel of the front axle of the tandem pair being illustrated), as is typical in an 18-wheel trailer which would also have a front axle on the trailer and a pair of axles on the truck cab. It is the tandem rear axles 16, 18 and axle housings 12, 14 of the trailer, however, to which the present invention applies and thus only this aspect of the trailer is fully illustrated.

Conventionally, the suspension system of some of the trailers such as the trailer 10 comprises leaf spring sets 24, 26 which are carried in respective housings 28, 30, 32 at the respective ends thereof, only three of the housings being illustrated. The housing 28 at the front end of the springs are securely fastened to the front axle housing 12 while the housings 30, 32 at the rear ends of the springs are securely fastened to the rear axle housing 14. Intermediate the ends of each leaf spring set is a respective fixed axle or rod 34 fixedly carried by brackets 36 or the like from a rail 38 forming a portion of the chassis of the trailer. A split clamping block 40 (only one of which is illustrated) is clamped about the rod 34 beneath each leaf spring set 24, 26 and is clamped together by U-bolt clamps 42, 44 which extend about each set of leaf springs 24, 26. Thus, the leaf springs are carried suspended by and from the chassis of the trailer and are secured to the axle housing 12, 14.

At the rear of the vehicle intermediate a cross channel member 46 forming a portion of the chassis of the trailer and a hollow beam 48 welded to the axle housing 14 are a pair of air bags 50, 52 similar to the bags used as air springs in some of the trailer suspension systems, the air bags including respective pedestals 54, 56 which are positioned on the beam 48. Air conduits 58, 60, 62 connect the air bags to valving 64 which in turn is connected to a compressor 66 conventionally mounted within the truck that pulls the trailer 10. When the valving is opened selectively to permit the air bags to pressurize, a separating force is applied between the beam 48 and the channel 46 resulting in the leaf springs at the rear housings 30, 32 being pushed downwardly thereby to pivot the leaf springs about the rod 34. This lifts the front housings 28 of the leaf springs to lift the forward axle housing 12 and axle 16 thereby to raise the wheels 20 above the road surface.

Consequently, once the trailer has been unloaded and is no longer carrying a load, the wheels 20 may be raised above the road surface to preclude wear on the wheels and the brakes of the wheel assemblies. This reduction in wheel or tire and brake wear can be quite cost effective merely by pressurizing the air bags. When the trailer is to be loaded, the air bags 50, 52 are depressurized and the tires 20*a* are again positioned on the road to aid in absorbing the load. Alternatively, there may be air bags associated with each axle which are pressurized while the trailer carries its load and wherein one set of air bags may be depressurized to raise one axle relative to the other. Thus, a very simple and inexpensive structure and method is proposed for lifting one of the axles of a tandem axle trailer relative to the other axle and thereby lift the wheels and tires off the road.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of raising one axle of a tandem axle trailer to lift a wheel assembly on said one axle while a wheel assembly on a second axle remains substantially unmoved vertically, said trailer having a chassis supporting a suspension system including a leaf spring having an end fastened to each axle and supported intermediate said axles from said chassis by a support beneath said leaf spring, said method comprising:

selectively applying a force in a downward direction to said second axle to move the end of the leaf spring fastened thereto downwardly thereby pivoting said one axle upwardly with the end of said leaf spring fastened to said one axle, and maintaining the force on said second axle to maintain said one axle in a raised position.

2. A method as recited in claim 1, wherein said applying a force to said second axle comprises applying a fluid under pressure to a flexible container disposed intermediate said second axle and said chassis.

3. A method as recited in claim 2, wherein said applying a force to said second axle comprises applying pressurized air to a bag disposed intermediate said second axle and said chassis.

4. Apparatus for selectively raising a first axle of a tandem axle trailer so as to lift the wheels mounted on the axle above the roadway on which the trailer is supported, said trailer having a chassis and a suspension system including leaf springs having one end fastened to said one axle and a second end fastened to the second axle of the tandem axle trailer, and a support intermediate said one end and said second end fastened to said chassis for supporting said springs from said chassis, said apparatus comprising at least an air bag disposed intermediate said chassis and said second axle, a source of pressurized air, valving for feeding said pressurized air to said air bag selectively for pressurizing said bag and applying a downwardly directed force to said second axle to force said leaf spring to pivot about said support and lift said first axle wherein wheels connected to said first axle are lifted off the roadway.

5. Apparatus as recited in claim 4, wherein said support is disposed beneath said leaf springs and said one end of said leaf springs is raised when said downward force is applied to said second axle.

\* \* \* \* \*